(12) United States Patent
Johnson et al.

(10) Patent No.: US 7,614,679 B1
(45) Date of Patent: Nov. 10, 2009

(54) TAILGATE DOOR ASSIST

(76) Inventors: Glenn Johnson, 36 Village Rd., Beach Lake, PA (US) 18405; Justin M. Pallay, Box 46 Woodledge City, Woodledge City, PA (US) 18426; John Pallay, Box 92 Woodledge, Woodledge, NJ (US) 14828

( * ) Notice: Subject to any disclaimer, the term of this patent is extended or adjusted under 35 U.S.C. 154(b) by 330 days.

(21) Appl. No.: 11/646,944

(22) Filed: Dec. 29, 2006

(51) Int. Cl.
*B60P 33/03* (2006.01)
(52) U.S. Cl. ........................ 296/57.1; 296/50
(58) Field of Classification Search ............... 296/50, 296/57.1, 61, 146.8, 164.11, 14.116; 16/72, 16/76, 78, 85; 414/537
See application file for complete search history.

(56) References Cited

U.S. PATENT DOCUMENTS 7,029,050 B1 * 4/2006 Johnson et al. ............ 296/57.1

* cited by examiner

*Primary Examiner*—Lori L Lyjak
(74) *Attorney, Agent, or Firm*—Robert S. Salzman; Law Office of Robert S. Salzman

(57) ABSTRACT

An apparatus for assisting with the handling of a door of a tailgate cart features two springs that are strung in seriatim. The first spring is connected at one end to the tailgate door, and connects to the second spring at its other end. The second spring is anchored at a distal end to the frame of the tailgate cart. The first spring has a shorter length than the second spring. As the tailgate door is pivotally lowered from its upright position, the shorter spring moves in tension providing a matching small force. As the tailgate door reaches the end of its travel, the second spring adds its compressive force to the first spring, and a greater force is provided to counterbalance the door.

12 Claims, 3 Drawing Sheets

TAILGATE DOOR ASSIST

FIELD OF THE INVENTION

The present invention pertains to gardening equipment, and more particularly to an improved apparatus for assisting the opening and closing of a door of a tailgate cart.

RELATED UNITED STATES PATENT

This application is an improvement over the parent invention, U.S. Pat. No. 7,029,050. The teachings of this patent are to be incorporated into this invention by way of reference.

BACKGROUND OF THE INVENTION

Tailgate carts have become very popular with gardeners and landscapers in recent times. These carts are hitched to a truck, and provide a large cargo area for the storage and transportation of mowers, ladders, tillers, edging tools, weed-whackers, and other gardening and landscaping equipment. These tailgate carts have a low center of gravity, making them very stable in transporting heavy gardening tools. A tailgate cart of the kind that is described above, is shown and described in the parent invention, U.S. Pat. No. 7,029,050.

One outstanding feature of these tailgate carts is their large access door. The door is extends many feet above the Loading-bed, and its bottom is pivotally connected to the base of the tailgate frame surrounding the loading bed. To access the equipment disposed in the bed of the cart, the door is pulled down about its pivots, until the top of the door touches the roadway. In this position, the door acts like a loading and unloading ramp. The equipment is then easily rolled off the cart for the next landscaping job.

The door of the cart is very heavy, and is latticed to reduce its weight for handling purposes. Yet, despite being latticed, the tailgate door is not easily lifted, or lowered.

In the aforementioned parent, patented invention, a double spring assist device for opening and closing the door, is illustrated and described. This double spring device is mounted on the top of the frame of the tailgate bed. The springs are free to extend along the frame in tandem. A cable or chain is attached to the first one of the springs via a double pulley, and as the door is lowered and raised, the springs are caused to extend and contract, accordingly. The extension of the first and second springs counterbalance the force of the pivoting door in accordance with Hook's law: $F_1+F_2=K_1X_1^2+K_2X_2^2$, where $F_1+F_2$ are the forces required to lower and lift the door, $K_1$ and $K_2$ are the respective spring constants in pounds/foot$^2$; and $X_1$ and $X_2$ are the distances traveled by each spring in feet.

One of the major problems with the parent assist device is that the springs tend to pull on each other as they react to the lowering of the door, and do not uniformly apply a matching force response. It was found that by making the second spring a compression spring, and the first spring a tension spring, a more uniform force response was achieved.

Another problem that was uncovered was the operation of the pulleys in the forward perch unit. These twin pulleys tended to guide the cable in a vertical fashion. This caused excessive cable wear over time. It was found that it was much better to allow the cable to swing freely without being guided, as it departs the spring assembly. To achieve this, the forward cable is now fed through a ball race consisting of five rotating balls in juxtaposition to each other. The cable riding over these rotating balls does not experience any vertical guiding forces, which tend to wear the cable over time, as aforementioned. The result is that the forces exerted upon the system during the lowering of the door, is now more uniform, and the cable assist device is more rugged.

The present invention, seeks to provide a more uniform counterbalancing of the spring force vis-à-vis the lateral force component of the gravity vector of the tailgate door. This result is accomplished by different counter-balancing, i.e. two springs, one of which is in tension, and the other of which is in compression. The two counterbalancing springs act more smoothly in dealing with the forces produced by gravitational pull of the tailgate door. The invention has two springs of unequal length disposed in seriatim. The smaller, or first, tension spring shoulders most of the load, when the tailgate door is being initially lowered. As the door reaches a 45° angle with respect to the tailgate base, the second, longer compression spring begins to shoulder the existing force. As the top of the door reaches the floor, both the first and second springs are fully operative to allow the door to be gently placed upon the ground. In the equation, Force=$F_1$+$F_2$=$K_1X_1^2$+$K_2X_2^2$, the extension of the springs of different length and/or different spring constant of this invention, furnish a non-linear response to the non-linear lateral force component of the door. The first spring supplies a lower counterbalancing force, than the second spring. The counterbalancing force pattern is less in the beginning of the door travel, but greater at the end of the door travel. In other words, the nonlinear response pattern is molded to more closely fit the force vectors of the tailgate door.

SUMMARY OF THE INVENTION

In accordance with the present invention, an apparatus for assisting the opening and closing of a door of a tailgate cart, is described. The apparatus is comprised of a housing containing two springs connected in seriatim. The springs are coil springs, and generally follow Hook's law. The springs are designed to provide a counterbalancing force for the opening and closing of a door of a tailgate cart. Owing to the non-linear response required to match the lateral force component of the gravity vector of the door, the two springs are designed to provide a matching response. The apparatus is comprised of a tubular housing, or housings, for containing the two, first and second springs. The first spring is a tension spring, and the second spring is a compression spring. The housing is anchored to the top of the frame of the tailgate cart. The two springs are free to move within the housing(s). The first and second springs are connected to each other in seriatim, at their distal ends by a first cable. The first cable wraps about a pulley that is fixed to the rail of the cart, a small distance from the housings. It is rotationally free to convey the moving first cable between the springs. A ball race is disposed a small distance from the housings, and allows for unfettered movement of a second cable attached to the remaining distal end of the first tension spring. The second cable is attached to the tailgate door via a chain and clip. The second cable and chain is in tension with respect to the tubular housing and frame. As the tailgate door is lowered from its fully erect position, the first spring of the apparatus is caused to expand in tension. At the moment that the first spring is stretched, the second spring compresses to accommodate the load until the top of the tailgate door contacts the ground. The process is reversed as the tailgate door is lifted from the floor, and back into place, i.e. into its fully upright position.

It is an object of the present invention to provide an improved tailgate door assist device.

It is another object of the current invention to provide a tailgate door assist device that provides a non-linear uniform response with respect to the movement of the tailgate door.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, an apparatus for assisting with the raising and lowering of a door of a tailgate cart, is described. The apparatus features two springs that are strung in seriatim. The first spring is in tension, and is connected at one end to the tailgate door via a ball race. At its other end, it connects to the second spring via a piston. The second spring is in compression, and is compressed by the piston that is free to move along the second housing. The second housing rests upon the frame of the tailgate cart. The first spring has a shorter length than the second spring. As the tailgate door is pivotally lowered from its upright position, the shorter spring provides a matching small force. As the tailgate door reaches a midpoint of its travel, the second spring adds its compressive force to the tensile force of the first spring. The two springs counterbalance the weight of the tailgate door.

Figure 1:
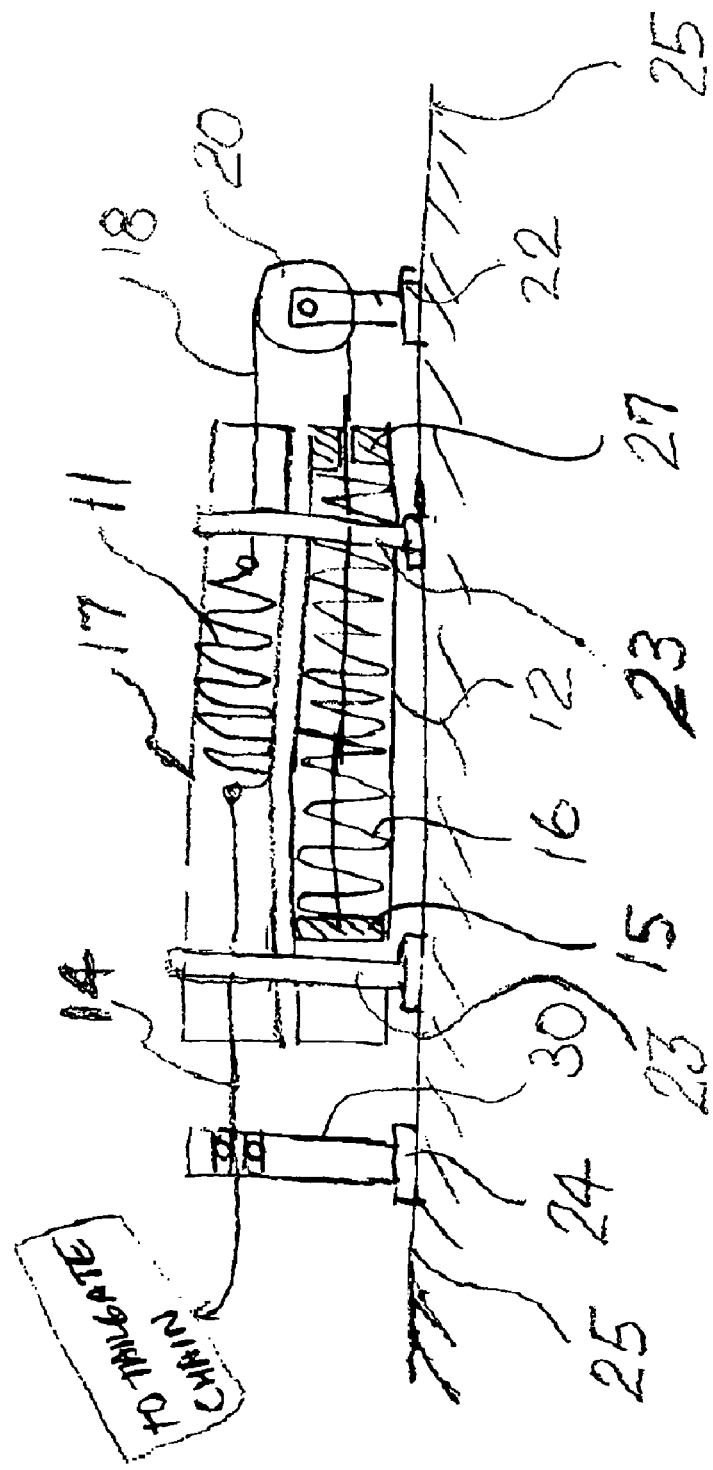
FIG. 1 shows a schematic view of the invention.
Figure 2:
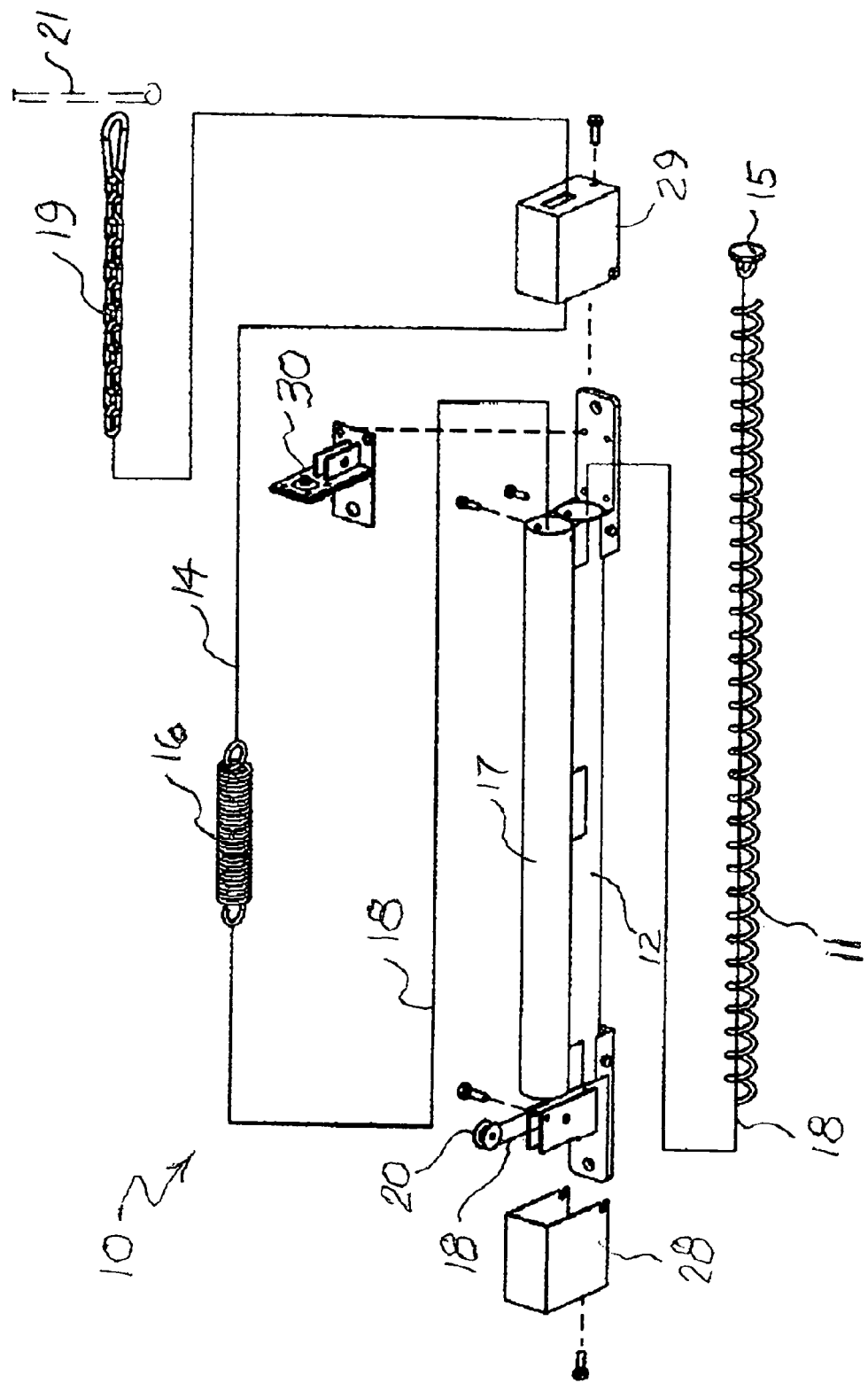
FIG. 2 illustrates a perspective, exploded view of the tailgate assist device of the present invention.

Now referring to FIGS. 1 and 2, a tailgate assist device 10 is shown in schematic and exploded view, respectively. The tailgate assist device 10 comprises a second housing 12 containing a second, coiled, compression spring 11 that is compressed by a movable piston 15. The piston 15 is drawn inside the second housing 12 by a second cable 18 that runs through the center of the second, coiled, compression spring 11, and attaches to one end of the first, coiled tension spring. Cable 14 is attached at the other end of the first, coiled tension spring 16 contained within the first housing 17. The cable 14 is attached at its other end to a pivotal tailgate door 21, via a chain 19.

The springs contained in the housings provide a counterbalancing force to the pivotal movement of door 21.

Figure 3:
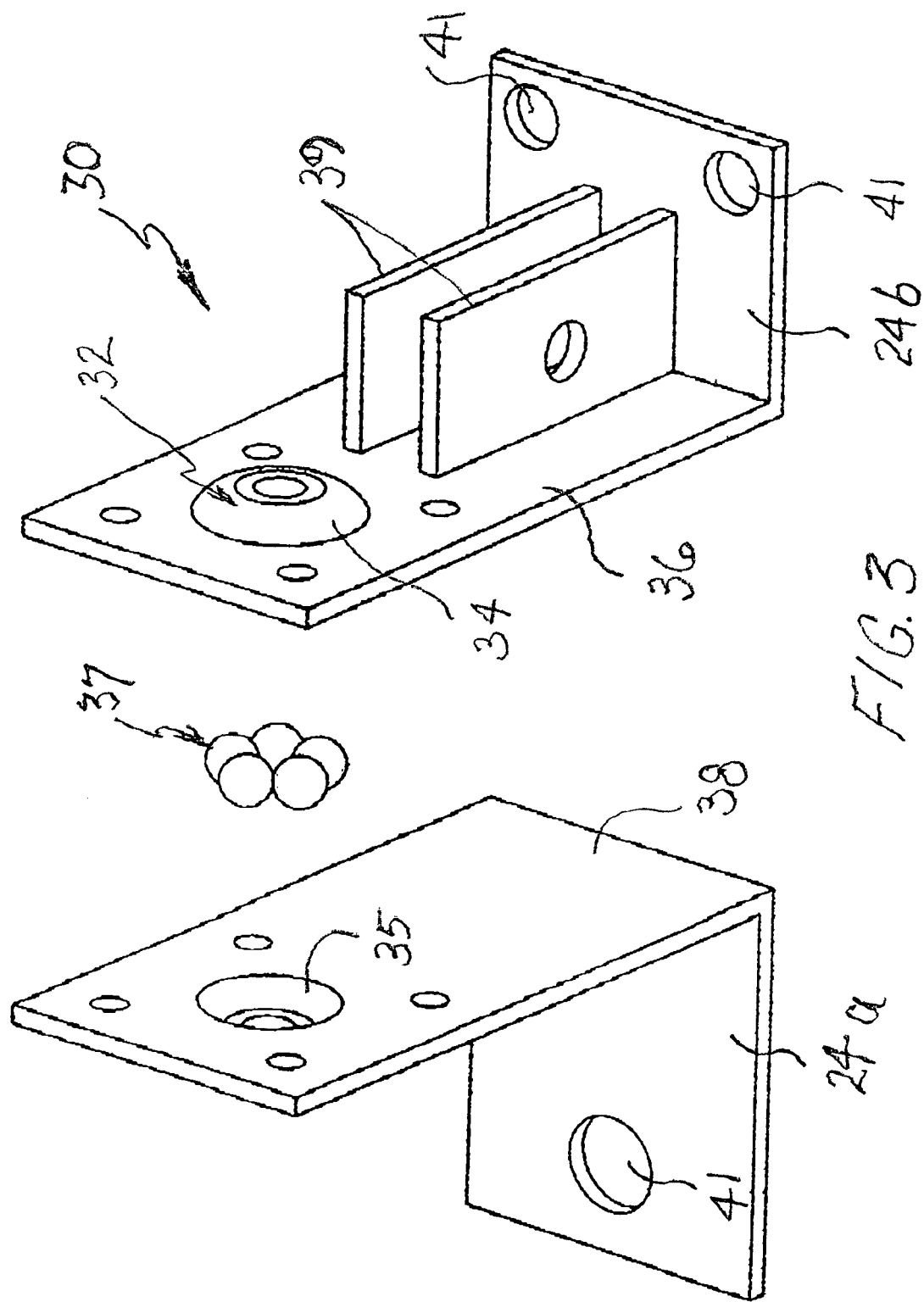
FIG. 3 depicts a perspective, exploded enlarged view of a ball race illustrated in FIG. 2.

The tailgate assist device 10 is shown mounted on top of one of the side frames 25 of the tailgate cart (not shown). The tailgate door 21 is depicted in schematic. Now referring to FIG. 3, an exploded view of a ball race 30 is observed. The ball race 30 provides support, but does not guide, the cable 14 that attaches to the door 21 via chain 19. The ball race 30 is comprised of five independently spinning balls 37 housed within cavity 32. The balls 37 are confined in cavity 32, which is disposed within vertical plates 36 and 38. The balls 37 are free to gyrate within the cavity, i.e. they can rotate in any direction. The cavity 32 is formed by two dimpled impressions 34 and 35 that are stamped into the vertical plates 36 and 38. The balls 37 form an opening at their tangential surfaces, which allows for the cable 14 to slide through in a free-wheeling manner, i.e. the cable is free to move in any direction. The cable is not constrained or guided, and it is free to bank to the right or left, or move up or down. The balls 37 provide a frictionless surface upon which the cable can move. The horizontal plates 24a and 24b, comprise the mounting bracket 24, when pushed together. The vertical plates 39 mounted perpendicular to vertical plates 36 and 38, lend torsional stiffness to the vertical plates 36 and 38. Mounting holes are provided for bolting the bracket 24 to tailgate frame 25.

It should be observed that other modifications and changes varied to fit particular operating requirements and environments will be apparent to the skilled practitioner of this art, the invention is not considered limited to the example given for purposes of disclosure, but rather is deemed to cover all changes and modifications which do not constitute departures from the true spirit and scope of the invention.

Having thus described the invention, what is desired to be protected by Letters Patent is presented in the subsequently appended claims.

What is claimed is:

1. An apparatus for assisting the raising and lowering of a tailgate door pivotally attached to a bed of a tailgate cart, comprising: a dual spring system of tension and compression springs, supported by a frame of said tailgate cart, said dual spring system including two springs connected in tandem via a cable that is supported for movement about an intermediately placed pulley; and means for attaching said first spring to said tailgate door via a ball race.

2. The apparatus in accordance with claim 1, wherein said first spring is shorter than said second spring.

3. The apparatus in accordance with claim 1, wherein said first spring has a different spring constant than said second spring.

4. The apparatus in accordance with claim 1, wherein said dual spring system provides a non-linear response to movement of said door.

5. The apparatus in accordance with claim 1, wherein said first spring comprises a tension coil, and said second spring comprises a compression coil.

6. The apparatus in accordance with claim 1, wherein said first spring and said second spring are each supported within separate tubular housings.

7. An apparatus for assisting the raising and lowering of a door pivotally attached to a tailgate cart, comprising: a dual spring system including a first coiled spring movably attached to said door; a second coiled spring movably attached to said first coiled spring in tandem; each of said first and second coiled springs being movably supported within separate tubular housings that are supported by said tailgate cart, and further comprising a door cable support including a ball race disposed adjacent said tubular housing for allowing free-wheeling movement of said door cable.

8. The apparatus in accordance with claim 7, wherein said first coiled spring is shorter than said second coiled spring.

9. The apparatus in accordance with claim 7, wherein said first coiled spring has a different spring constant than said second coiled spring.

10. The apparatus in accordance with claim 7, wherein said dual spring system provides a non-linear response to movement of said door.

11. A cable support system for a door assist that connects to a tailgate door via a cable, said cable support system comprising a ball race including a number of gyrating balls captured within means defining a raceway cavity, said balls providing means through which said cable is able to slide in a free, unguided manner.

12. The cable support system in accordance with claim 11, wherein said ball race includes five balls.

* * * * *